United States Patent
Izzo et al.

(10) Patent No.: US 10,585,412 B2
(45) Date of Patent: Mar. 10, 2020

(54) SAFETY CONTROLLER USING HARDWARE MEMORY PROTECTION

(71) Applicant: Rockwell Automation Technologies, Inc., Mayfield, OH (US)

(72) Inventors: Joseph P. Izzo, New Berlin, WI (US); Nicholas L. Stay, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 304 days.

(21) Appl. No.: 15/430,932

(22) Filed: Feb. 13, 2017

(65) Prior Publication Data

US 2018/0231949 A1 Aug. 16, 2018

(51) Int. Cl.
*G06F 12/00* (2006.01)
*G05B 19/042* (2006.01)

(52) U.S. Cl.
CPC .......... *G05B 19/0428* (2013.01); *G05B 2219/24008* (2013.01); *G05B 2219/36546* (2013.01)

(58) Field of Classification Search
CPC ...... G05B 19/0428; G05B 2219/24008; G05B 2219/36546
See application file for complete search history.

(56) References Cited

U.S. PATENT DOCUMENTS

| 9,092,023 B2 | 7/2015 | Schultz et al. |
| 9,501,804 B2 | 11/2016 | Kaufman |
| 2013/0018484 A1 | 1/2013 | Schultz et al. |

FOREIGN PATENT DOCUMENTS

| EP | 2237155 A2 | 10/2010 |
| WO | 2016/010704 A1 | 1/2016 |

OTHER PUBLICATIONS

Extended European Search Report dated Jul. 13, 2018; Application No. 18155902.2—(11) pages.

*Primary Examiner* — Gurtej Bansal
(74) *Attorney, Agent, or Firm* — Boyle Fredrickson, SC

(57) ABSTRACT

Hardware memory management units are used in an integrated safety/non-safety industrial computer to allow shared memory architecture processors to implement safety and non-safety reduced risk of memory corruption. Testing of the memory management unit of the non-safety processor may provide a periodic writing to protected memory to invoke a protection fault providing a report to the safety processor.

20 Claims, 3 Drawing Sheets

SAFETY CONTROLLER USING HARDWARE MEMORY PROTECTION

CROSS REFERENCE TO RELATED APPLICATION

Background of the Invention

The present invention relates to industrial controllers and in particular to safety industrial controllers such as may be used to implement critical control functions such as those that affect human lives and safety.

Industrial controllers are special purpose computers used for controlling industrial processes or manufacturing equipment. Industrial controllers differ from conventional computers in that industrial controllers normally control the real-time operation of machinery and physical processes. This difference in purpose and application affects both the construction of the industrial controller, which is normally hardened against environmental contamination and physical damage, and the architecture of the industrial controller which must provide defined rapid response, necessary for real-time control, and which must provide a high level of reliability in applications were failure can cause costly damage to equipment or loss of product.

Under the direction of a stored program, the industrial controller examines a series of inputs from sensors reflecting the status of the controlled process and changes a series of outputs to actuators controlling the industrial process. The sensor inputs may be binary, that is on or off, for example, from a limit switch, or may be analog, that is, providing a multi-valued output that may vary within a continuous range, for example, from a temperature sensor, camera, or the like. Similarly the actuator outputs may be binary, for example, controlling a solenoid or shut off valve, or analog controlling a metering valve, motor, linear positioning element, or the like. Typically analog signals are converted to binary words for processing.

Industrial controllers may employ one or more processors sequentially executing instructions of a control program stored in electronic memory to read and write control values to an input/output (I/O) table being part of an I/O circuit. The I/O table maybe scanned independently of execution of the control program to communicate the control values as electrical control signals between the I/O table and the controlled equipment. The use of an I/O table provides deterministic operation that reduces race conditions.

An important application of industrial controllers is in "safety control". Safety control is used in applications where failure of an industrial controller can create a risk of injury to humans. While safety control is closely related to reliability, safety control places additional emphasis on ensuring correct operation even if it reduces equipment availability. For that reason, safety controllers may provide run time diagnostic capabilities to detect incorrect operation and to move the control system to a predefined "safety states" if a failure is detected. The safety states will depend on the particular process being implemented and causes the actuators to assume a state predetermined to be safest when control correctness cannot be ensured. For example, an actuator controlling cutting machinery might move that machinery to a stop state where is an actuator providing air filtration might retain that machinery in an on state.

Safety control capability may be designated, for example, by "safety integrity levels" (SIL) defined under standard IEC 61508 and administered by the International Electrotechnical Commission (IEC) under rule hereby incorporated by reference.

Often it is desired to provide an industrial controller that can provide for both safety control and the ability to further execute "non-safety aspects of the control process (for example, the generation of status reports and data logging). Such an integrated system isolates the safety tasks and non-safety tasks to allow separate certification of the safety tasks greatly reducing the cost of implementing the entire control system. This allows standard programs and hardware to be used for some non-safety functionality.

The effectiveness of such integrated systems requires communication of data between the safety and non-safety tasks in a way that does not risk corruption of the safety tasks by errant operation of the uncertified non-safety tasks. This can be done by providing fully redundant hardware (processors, memory, and I/O) and limiting the communication between the safety and non-safety tasks to channels controlled by the safety tasks. Such redundancy is costly and may not be necessary for all safety applications, for example, SIL-2 level safety.

With the advent of multicore processors, a possible construction of an integrated industrial controller might segregate safety and non-safety tasks to different microprocessor cores. Such cores, however, normally share memory including, for example, memory caches and mass memory systems such as random access memory and disk memory increasing the possibility that the non-safety tasks could corrupt the safety tasks by writing over data or programs of the safety tasks stored in shared memory. This effectively limits the ability to multicore processors in isolating safety and non-safety tasks in an integrated control system.

SUMMARY OF THE INVENTION

The present invention provides an integrated control system that uses a multicore processor for the isolation of safety and non-safety tasks while limiting the ability of the non-safety tasks to corrupt of the memory of the safety tasks using the hardware memory management unit (MMU) of the core running the non-safety tasks (the "non-safety core"). Memory protection is a standard feature of MMU's, but because the MMU of the non-safety core is controlled exclusively by the non-safety core, its proper configuration and continued diagnostic evaluation is under control of the non-safety core and thus apparently unreliable. That is, trusting the MMU to prevent corruption of the safety programs by the non-safety core is undercut by the fact that the non-safety core controls the MMU.

The present invention addresses this apparent obstacle through the use of a two-step, run time MMU evaluation in which the "non-safety" core attempts to write to protected memory of the safety core and then reports that failure to the safety core for final evaluation. The risk of the "non-safety" core erroneously reporting a write failure (indicating correct configuration of the MMU) is reduced by various of: (1) employing a hardware interrupt procedure of the non-safety core (triggered by the write failure) to generate the report to the safety core, and (2) requiring that report to include a predetermined value provided by the safety core.

Using the reliable safety core to evaluate memory protection failure provoked by the non-safety core largely overcomes the untrustworthiness of the non-safety core.

Specifically, the present invention provides a safety controller with a first and second processor each including a hardware memory management unit and with an electronic memory addressable by both the first and second processor. The hardware memory management units have memory protection tables with protection flags which, once set, up, block a writing to addresses of the electronic memory.

The first processor executes the first program to: (i) set protection flags of its memory management unit to permit writing to the electronic memory in a first region holding a first program executed by the first processor and not in a second region holding a second program executed by the second processor; and (ii) periodically attempt to write to the second region.

The second processor executes the second program to: (i) set protection flags of its memory management unit to permit writing to the electronic memory in the second region and not in the first region; and (ii) confirm that the first processor is blocked by its memory management unit from writing in the second region.

It is thus a feature of at least one embodiment of the invention to provide a method of certifiable testing of the MMU of the "non-safety" processor necessary for the MMU to be relied upon to prevent interference from non-safety tasks in a hybrid system. By placing the final responsibility for assessing the proper settings of the MMU of the non-safety processor with the safety processor, the problem of having a non-safety processor test itself to safety standards is addressed.

The first and second processors may include hardware interrupt circuitry responsive to interrupt signals to jump to an interrupt vector for execution of instructions at the interrupt vector, and the hardware memory management unit of the first processor may provide a given hardware interrupt signal to the first processor when a write to an address associated with a set protection flag is attempted, and the first program may provide given interrupt service instructions at the interrupt vector associated with the given hardware interrupt signal to report a write failure to the second processor.

It is thus a feature of at least one embodiment of the invention to place the reporting task of the non-safety processor in a hardware interrupt routine thus better protecting it from interference from possibly erroneous non-safety application programs. Problems of the non-safety application programs blocking execution of the interrupt routine are limited by the natural hierarchy having hardware interrupts.

The hardware interrupt may be associated with a page protection fault and not with a general memory write fault.

It is thus a feature of at least one embodiment of the invention to prevent invocation of the reporting routine except in cases where the actual test of protected memory has been performed.

The first and second processor may execute the respective first and second programs to set protection flags of their respective memory management units to permit writing to the electronic memory in a shared region, and the given interrupt service instructions may cause a "key writing" to the electronic memory by the first processor in at least one address of the shared region, the key writing indicating a write failure, and the second processor may execute the second program to confirm that the first processor is blocked by its memory management unit from writing in the second region by testing for the key writing and may provoke a safety state if that test indicates the key writing has not occurred.

It is thus a feature of at least one embodiment of the invention to provide a simple method of communication between the safety processor and non-safety processor through shared memory.

The second processor may further operate to erase the key writing in the shared region after confirming the key writing is in the shared region.

It is thus a feature of at least one embodiment of the invention to permit dynamic repeated checking of the MMU status during runtime.

The value of the key writing may be provided by the second processor to the first processor.

It is thus a feature of at least one embodiment of the invention to guard against memory errors that would prevent erasing of the key writing in the shared memory or other similar errors.

The first processor may periodically attempt to write to the second region at different portions of the second region.

It is thus a feature of at least one embodiment of the invention to provide a comprehensive survey of the protection bits of the MMU.

The second processor may further test that the first processor is periodically attempting to write to the second region at different portions of the second region and provokes a safety state if that test indicates that the first processor is not periodically attempting to write to the second region at different portions of the second region.

It is thus a feature of at least one embodiment of the invention to ensure supervision by the safety processor that the entire MMU is being evaluated.

The first processor may communicate different key values to the second processor according to the different portions of the second region at which the first processor attempts to write, and the second processor may confirm that the first processor is attempting to write to different portions of the second region by analyzing the different key values and may enter a safety state if the key values do not indicate that the first processor is attempting to write to different portions of the second region.

It is thus a feature of at least one embodiment of the invention to provide a mechanism so that the safety processor can evaluate the actions of the non-safety processor in checking the MMU protection regions.

The second processor may communicate values to the first processor indicating different portions of the second region at which the first processor attempts to write.

It is thus a feature of at least one embodiment of the invention to place the responsibility for scanning through the protected regions of the MMU on, the safety processor thereby simplifying the tasks performed by the non-safety processor in testing the MMU to reduce the chance of failure.

The second program may provide for a certified SIL-2 level of safety in the execution of a control portion of the second program controlling the industrial actuators and sensors and the first program may provide less than a certified SIL-2 level of safety in the execution of the first program.

It is thus a feature of at least one embodiment of the invention to provide an integrated controller that can simultaneously handle both safety and non-safety tasks.

The memory protection table may be part of a page table providing virtual address translation.

It is thus a feature of at least one embodiment of the invention to make use of standard MMU architectures for the purpose of safety control.

The first and second processors may be different cores of a multicore processor system having shared memory access.

It is accordingly a feature of one embodiment of the invention to permit use of multicore processors for the purpose of segregating safety and non-safety tasks in an integrated industrial controller despite their shared memory structures.

The second processor may further execute the second program to check if a predetermined location in the second region has been altered.

It is thus a feature of at least one embodiment of the invention to direct testing of select protected memory locations by the safety processor to detect some types of MMU protection errors.

These particular objects and advantages may apply to only some embodiments filling within the claims and thus do not define the scope of the invention.

DETAILED DESCRIPTION OF THE PREFERRED EMBODIMENT

Figure 1:
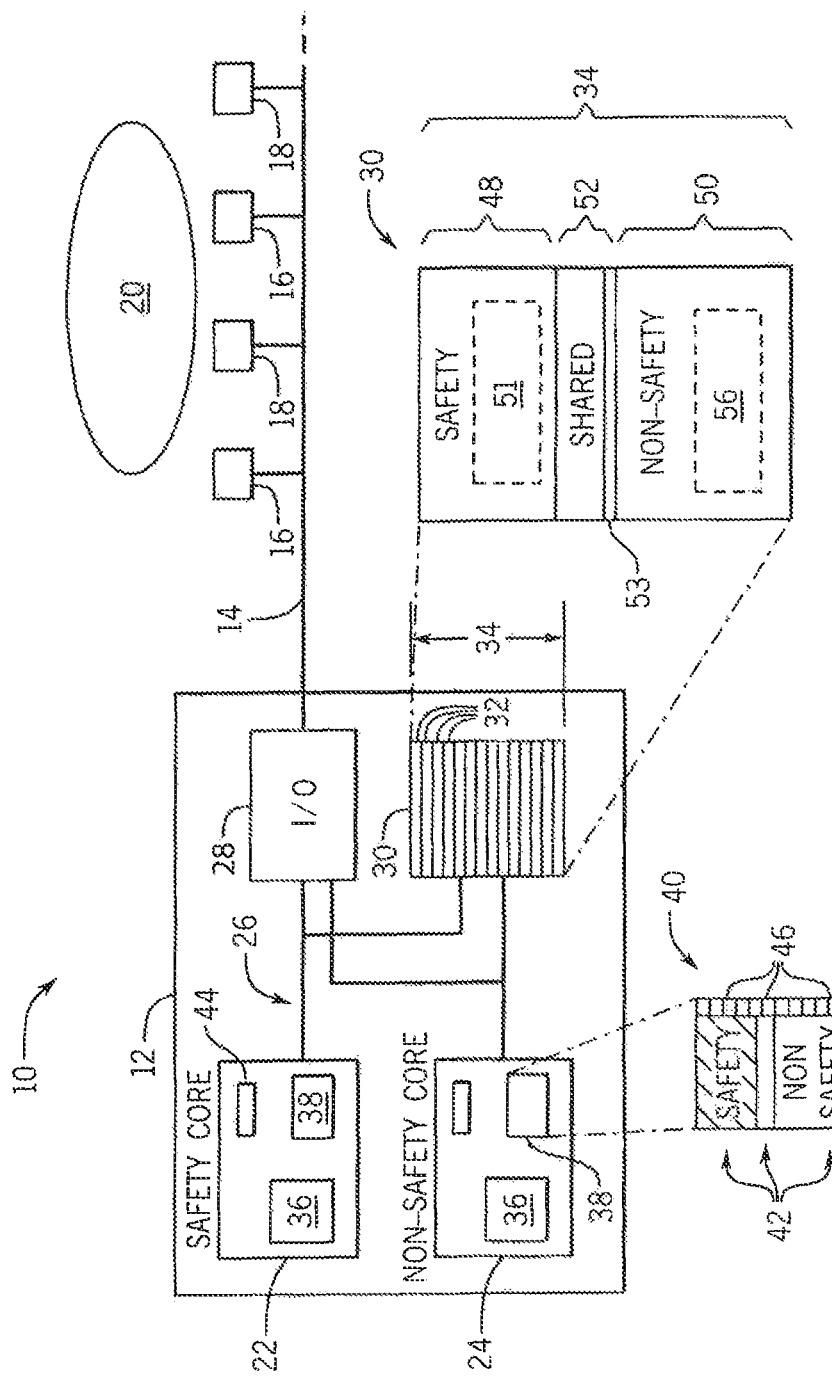
FIG. 1 is a block diagram of an integrated industrial controller for executing safety and non-safety tasks using two cores of a multicore microprocessor each having a memory management unit and showing expanded representations of the memory management unit page table and of shared memory, the latter having protected safety and non-safety regions holding respective safety and non-safety programs.

Referring now to FIG. 1, an industrial control system 10 may include a central controller 12 communicating over an industrial control network 14 with various sensors 16 and actuators 18 interfacing with a controlled process 20 such as components of a manufacturing plant or process.

The central controller 12 may include two different cores 22 and 24. For descriptive clarity, at times the first processor will be termed the "safety core" 22 and the second processor be termed the "non-safety" core 24. Generally these cores 22 and 24 have similar or identical hardware and differ primarily with respect to the programs they execute. In one, embodiment cores 22 and 24 may be different cores on a standard multicore microprocessor or may be specialized different cores (for example, having diverse architectures to reduce the chance of correlated errors) or may be separate microprocessors.

In a general case, each of the cores 22 and 24 share a bus structure 26 communicating with 110 circuitry 28 and with shared memory 30. The I/O circuitry 28 may provide an I/O table (not shown) recording state values for each of the sensors 16 and actuators 18 and the necessary circuitry for refreshing that I/O table based on communication protocols implemented on the control network 14.

The shared memory 30 will generally include a memory hierarchy, for example, an L2 or higher level cache, RAM, and mass storage in the form of a disk or solid-state disk. Each of the structures will be treated logically, that is as a single memory space having multiple addresses 32 within an address range 34, for descriptive clarity.

The industrial control network 14 may be specially designed for real time communication without data loss, for example, according to the EtherNet/IP™ standard, the DeviceNet™ or ControlNet™ administered by the Open DeviceNet Vendors Association (ODVA) and ControlNet International. Such networks provide prioritized, time critical data communication and may provide protocols insuring the detection of faults to a SIL-3 level.

Referring still to FIG. 1, each of the cores 22 and 24 will include a central processing unit (CPU) 36 and a memory management unit (MMU) 38. In some embodiments, the MMU 38 may implement multiple functions including address translation (between virtual and physical addresses) as well as memory protection. For both functions, the memory management units 38 may include a page table 40 having a set of entries 42 having a one-to-one mapping to individual addresses 32 or address ranges (typically blocks of addresses 32). These entries 42 may provide for the translation between virtual and physical address of a type known in the art for which purpose the MMU 38 may be associated with a translate lookaside buffer 44 providing caching operations for improved translation speed.

In addition, each of the entries 42 may be associated with a flag 46 describing whether the non-safety core 24 has write privileges with respect to writing to the particular addresses of the entry. If the non-safety core 24 attempts to write to an address where there are no write privileges, a memory protection fault will be generated as will be discussed below and the write prevented.

As will be discussed further below, these flags 46 of the page table 40 of each MMU 38 of each of the cores 22 and 24 may be used to segregate the memory 30 into exclusive regions for the cores 22 and 24, respectively. Generally the flags 46 may define a safety region 48 where there are write privileges only with respect to safety core 22 and a non-safety region 50 and where there are write privileges only with respect to the non-safety core 24. The flags 46 may define a shared region 52 where both the cores 22 and 24 have write privileges. In this respect entries 42 of the page table 40 of the non-safety core 24 will have flag bits set for those entries associated with the safety region 48 preventing a writing by the non-safety core 24 to the safety region 48. Similarly, entries 42 of the page table 40 of the safety core 22 will have flag bits set for those entries associated with the non-safety region 50.

The safety region 48 may hold a safety program 51 executed by safety core 22 to provide for safe control of the controlled process 20 through a reading of sensors 16 and a writing of actuators 18 and may include a data space 54 holding data associated with that safety program 51 including the I/O table of the I/O circuitry 28.

Conversely, the non-safety region 50 may hold a non-safety program 56 associated with the non-safety aspects of the control task executed by non-safety core 24. The non-safety region 50 may also hold an interrupt service routine 53 as will be described below, typically at a predetermined address held in an interrupt vector table as will also be discussed.

Figure 2:
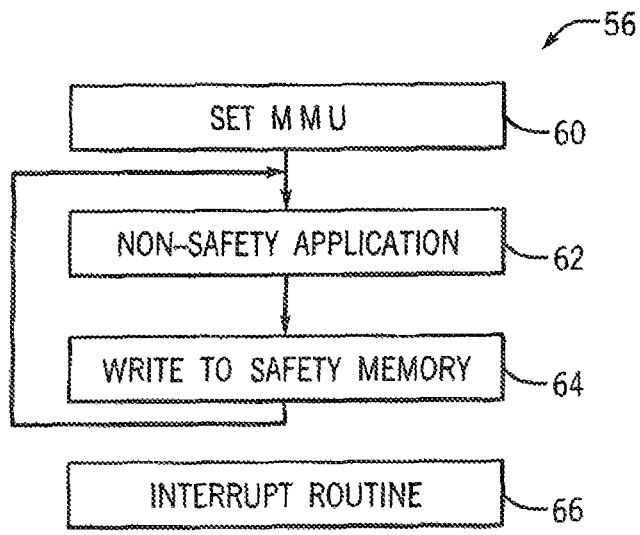
FIG. 2 is a simplified flowchart of a non-safety program and interrupt routine held in the non-safety region of the electronic memory executable by the non-safety core for testing MMU settings.

Referring now to FIG. 2, non-safety program 56 executed by the non-safety core 24 may initialize its associated MMU 38 as indicated by process block 62 to set protection flags 46 as described above to prevent the non-safety core 24 from writing to the protected safety region 48. The flags 46 that must be set are provided during a configuration process and may be cross checked, for example, by the safety core 22 (for example, by an exchange of information through the shared region 52) before the initialization is complete. After this initialization and as indicated by process block 62, the non-safety core 24 executes non-safety tasks such as data reporting logging and noncritical communication. Normally process block 60 is not repeated unless the system is reinitialized.

Periodically, for example, under the control of an operating system timer interrupt, the non-safety core 24 executes an MMU test of process block 64 in which it attempts to write to the protected safety region 48 as indicated by process block 66. This process may occur at a high frequency, for example, every second or as fast as every ten milliseconds to ensure errors are detected within a timeframe desired for SIL-2 certification.

As noted above, when non-safety core 24 attempts to write to the protected safety region 48 associated with set protection flags 46 of its page table 40, that write will be prevented (assuming the MMU 38 is properly configured) and the MMU 38 will generate a protected memory fault. This protected memory fault is determined solely by the setting of the protection flag 46 and is distinct from other types of memory fault, for example, general page faults, indicating that data is not yet available or that the data in one or more cache level is invalid.

Figure 4:
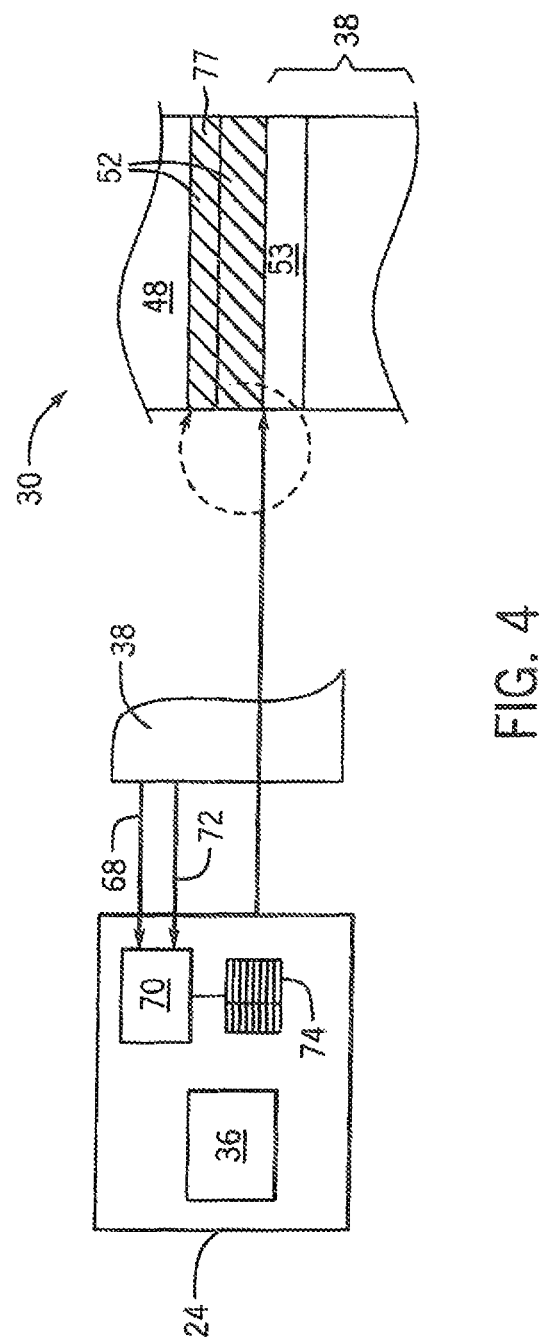
FIG. 4 is a simplified fragmentary representation of the non-safety core of FIG. 1 showing interrupt handling circuitry and an interrupt vector table used for initiating the interrupt routine of FIG. 2 with minimal interference from other tasks or the operating system.

Referring to FIG. 4, this protected memory fault is detected by hardware of the MMU 38 and results in a physical signal transmitted on a dedicated interrupt line 68. This interrupt line 68 is received by interrupt handling circuitry 70 of the non-safety care 24. Generally the non-safety core 24 may have multiple other interrupt lines, for example, a page fault interrupt line 72 that signals that the desired memory is not available, for example, in a cache. Again, the dedicated interrupt line 68 provides a signal that is distinguishable from normal memory faults to clearly indicate that the non-safety core 24 was trying to write to the protected region 48.

As is generally understood in the art, hardware interrupts coming in through interrupt line 68 or 72 may be handled by interrupt handling circuitry 70 generally distinct from the CPU 36 and thus generally isolated from the execution of a task by the CPU 36. The interrupt handling circuitry 70 matches the interrupt line (e.g., interrupt lines 68 or 72) to an interrupt vector using an interrupt vector table 74, for example, being a dedicated register holding memory addresses associated with each interrupt line. In response to an interrupt on interrupt line 68, the interrupt handling circuitry 70 "interrupts" execution by the CPU 36 at a current instruction (identified by a program counter register), saves the architectural state in a stack, and causes the CPU to jump to the memory address of the interrupt vector and begin executing instructions at this address which provide an interrupt service routine 53. In some embodiments, the address of the interrupt service routine 53 may be in read-only memory, for example, at low memory addresses. Thus the interrupt service routine 53 is immediately invoked with minimal possible corruption by other tasks executing on the non-safety core 24.

The interrupt service routine 53 may completely perform the necessary steps of communicating the results of the protected memory fault to the safety core 22 or, in some cases, start another thread for execution by the CPU 36 under the control of the operating system to complete this process and to minimize the run time length of the interrupt service routine 53.

In either case, the interrupt service routine 53 may write a special key 77 obtained from the safety core 22 to a specific location in the shared region 52 indicating that an attempt was made to write to protected safety region 48 that was successfully intercepted and stopped by the MMU 38. By using a specific key provided by the safety core 22 and writing it to a specific location in shared region 52 the chances of an accidental writing of this value by the safety core 22 to the correct location is made acceptably low.

After the interrupt service routine 53 is executed, the interrupt handling circuitry 70 returns the CPU 36 to the previously saved location of the program counter to resume execution of the non-safety program 56 and the testing of process block 64.

Figure 3:
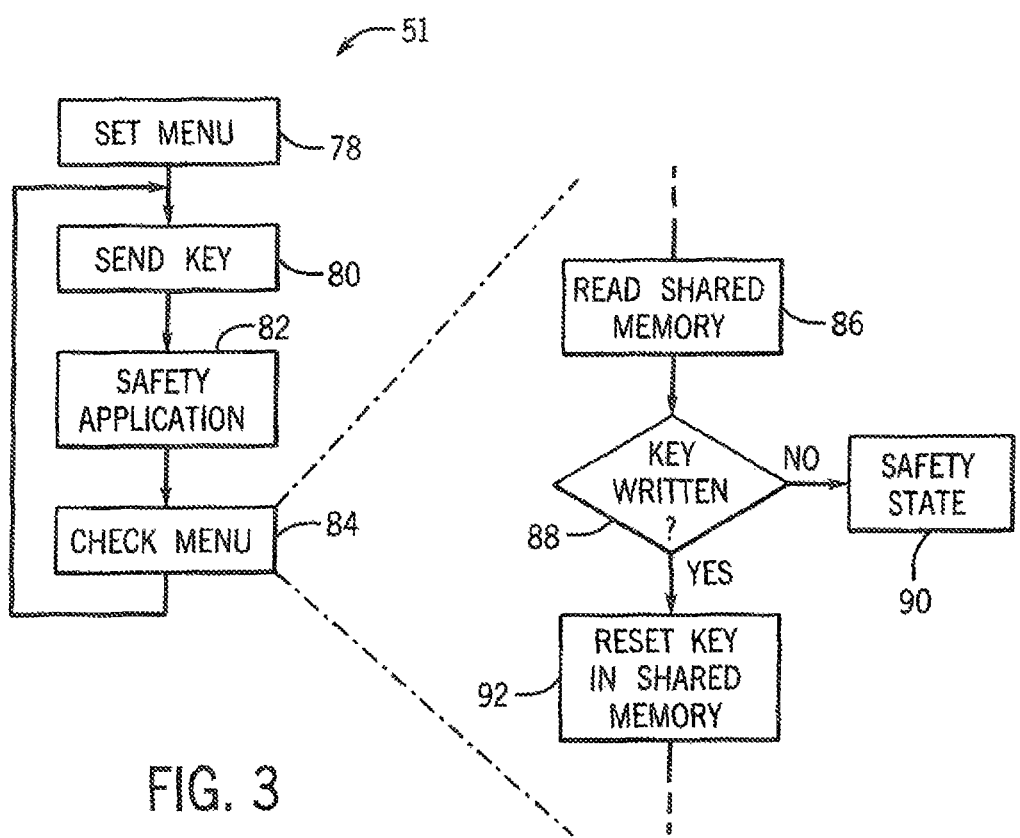
FIG. 3 is a figure similar to that of FIG. 2 showing a safety program executed by a safety core for evaluating MMU settings.

Referring now to FIG. 3, the safety core 22 may likewise execute its safety program 51 to be initialized as indicated by process block 78 setting the value of the protection flags 46 of the page table 40 of its MMU as discussed above. The initialization includes a second step 80 of sending the initial value of the key 77 to the non-safety core 24 for use by its interrupt service routine 53.

After the initialization, the non-safety core 24 executes the safety application as indicated by process block 82 and periodically, for example, driven by an operating system timer or the like, executes a check of the MMU 38 of the non-safety core 24 as indicated by process block 84. This check works in conjunction with process block 64 of non-safety program 56 to determine if the protection flag 46 of the MMU 38 of the non-safety core 24 is correctly set. Desirably, the periodicity of the check of process block 84 will be coordinated with the writing provided by process block 64 of the non-safety program 56 to ensure that at least one execution of process block 64 and ideally no more than one execution of process block 64 occurs before each execution of process block 84. By placing the final steps of the evaluation of the MMU 38 of non-safety core 24 under the supervision of safety non-safety core 24, the integrity of the final evaluation has increased certitude.

Referring still to FIG. 3, this checking of process block 84 reads the memory location in the shared region 52 in which the key 77 should have been written by the interrupt service routine 53 of non-safety core 24 as indicated by process block 86. This key 77, once read, is compared to the key sent by the safety core 22 during initialization of process block 80 to see if it matches, per decision block 88.

If at decision block 88, the key read from the shared region 52 does not match the key sent during process block 80, safety program 51 moves the industrial control system 10 into the safe state as indicated by process block 90 and provides suitable notification to the operator of an error.

On the other hand, if at decision block 88, the keys do match, then at process block 92 the key 77 written to shared region 52 by the interrupt service routine 53 is erased or reset pending the next evaluation.

Ideally, the checking of the MMU 38 of the non-safety core 24 will test all addresses (or blocks of addresses in the page table) related to the protected safety region 48. This may be done by sequentially or randomly varying the address written to at process block 64. Verification of the correct sequencing through the protected safety region 48 may be provided, for example, by the interrupt service routine 53 reporting out the address associated with the protection fault, for example, by passing, a value through the shared region 52 to the safety program 51. In this way the safety core 22 may check to make sure not only that there has been no erroneous writing to protected region 48 but also that this protection has been established for all addresses in protection region 48.

An alternative corroboration mechanism may operate under control of the safety core 22 which provides a constantly changing key 77 mapping to a particular address that should be checked by the non-safety core 24 to provide a similar communication allowing safety core 22 to confirm a complete and exhaustive checking of the region 48.

The loop of process blocks 62 and 64 on non-safety core 24 and process block 82 and 84 on non-safety core 24 continues during the operation of the control system 10 to provide dynamic run time confirmation of memory protection and not simply initial confirmation of that protection during start up.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a core", "a computer", "a processor" or "the microprocessor" and the like can be understood to include one or more cores of a multicore microprocessor or one or more processors or microprocessors that can communicate in a stand-alone and/or a distributed environment (s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A safety industrial controller comprising:
    a first core including a first processing unit and a first hardware memory management unit;
    a second core including a second processing unit and a second hardware memory management unit;
    an electronic memory having a plurality of addresses electronically addressable by both the first and second processing units and holding a first and second program executable by the first and second processing, respectively; and
    I/O circuitry adapted to communicate between industrial actuators and sensors and the safety industrial controller including at least one of the first and second cores;
    wherein the first hardware memory management unit includes a first memory protection table and the second hardware memory management unit includes a second memory protection table, each of the first and second memory management units having entries mapping to addresses of the electronic memory and wherein the entries hold protection flags which when set block a writing to addresses of the entries;
    wherein the first processing unit executes the first program to:
        set protection flags in the first memory protection table to permit writing by the first processing unit to the electronic memory in a first region holding the first program,
        set protection flags in the first memory protection table to prohibit writing by the first processing unit to the electronic memory in a second region holding the second program, and
        periodically attempt to write to the second region; and
    wherein the second processing unit executes the second program to:
        set protection flags in the second memory protection table to permit writing by the second processing unit to the electronic memory in the second region holding the second program,
        set protection flags in the second memory protection table to prohibit writing by the second processing unit to the electronic memory in the first region holding the first program, and
        confirm that the first processing unit is blocked by its memory management unit from writing in the second region.

2. The safety industrial controller of claim 1 wherein the second core further tests that the first core is periodically attempting to write to the second region at different portions of the second region and provokes a safety state if that test indicates that the first core is not periodically attempting to write to the second region at different portions of the second region.

3. The safety industrial controller of claim 1 wherein the second program provides for a certified SIL-2 level of safety in an execution of a control portion of the second program controlling the industrial actuators and sensors and the first program provides less than a certified SIL-2 level of safety in the execution of the first program.

4. The safety industrial controller of claim 1 wherein the safety state places the actuators in a predefined safe state.

5. The safety industrial controller of claim 1 wherein the memory protection table is part of a page table providing virtual address translation.

6. The safety industrial controller of claim 1 wherein the first and second cores are different cores of a multicore processor system having shared memory access.

7. The safety industrial controller of claim 1 wherein the second processing unit further executes the second program to check if a predetermined location in the second region has been altered.

8. The safety industrial controller of claim 1 wherein the first and second cores include hardware interrupt circuitry responsive to interrupt signals to jump to an interrupt vector for execution of instructions at the interrupt vector and wherein the hardware memory management unit of the first core provides a given hardware interrupt signal to the first core when a write to an address associated with a set protection flag is attempted and wherein the first program provides given interrupt service instructions at the interrupt vector associated with the given hardware interrupt signal to report a write failure to the second core.

9. The safety industrial controller of claim 8 wherein the hardware interrupt is associated with a page protection fault and not with a general memory write fault.

10. The safety industrial controller of claim 8 wherein the first and second processing unit execute the respective first and second programs to set protection flags of their respective memory management units to permit writing to the electronic memory in a shared region and wherein the given interrupt service instructions cause a key writing to the electronic memory by the first core in at least one address of the shared region, the key writing indicating a write failure and wherein the second processing unit executes the second program to confirm that the first core is blocked by its memory management unit from writing in the second region by testing for the key writing and provokes a safety state if that test indicates the key writing has not occurred.

11. The safety industrial controller of claim 10 wherein the second core further erases the key writing in the shared region after confirming the key writing is in the shared region.

12. The safety industrial controller of claim 10 wherein a value of the key writing is provided by the second core to the first core.

13. The safety industrial controller of claim 1 wherein the first core periodically attempts to write to the second region at different portions of the second region.

14. The safety industrial controller of claim 13 wherein the first core communicates different key values to the second core according to the different portions of the second region at which the first core attempts to write, and wherein the second core confirms that the first core is attempting to write to different portions of the second region by analyzing the different key values and enters a safety state if the key values do not indicate that the first core is attempting to write to different portions of the second region.

15. The safety industrial controller of claim 14, wherein the second core communicates values to the first core indicating different portions of the second region at which the first core attempts to write.

16. A method of providing integrated safety and non-safety control using a safety industrial controller having:
a first core including a first processing unit and a first hardware memory management unit;
a second core including a second processing unit and a second hardware memory management units;
an electronic memory having a plurality of addresses electronically addressable by both the first and second processing units and holding a first and second program executable by the first and second processing units respectively; and
I/O circuitry adapted to communicate between industrial actuators and sensors and the safety industrial controller including at least one of the first and second cores;
wherein the first hardware memory management unit includes a first memory protection table and the second hardware memory management unit includes a second memory protection table, each of the first and second memory management units having entries mapping to addresses of the electronic memory and wherein the entries hold protection flags which once set up block a writing to addresses of the entries;
the method including the steps of:
operating the first core to:
set protection flags in the first memory protection table to permit writing by the first processing unit to the electronic memory in a first region holding the first program,
set protection flags in the first memory protection table to prohibit writing by the first processing unit to the electronic memory in a second region holding the second program, and
periodically attempt to write to the second region; and
operating the second core to:
set protection flags in the second memory protection table to permit writing by the second processing unit to the electronic memory in the second region holding the second program,
set protection flags in the second memory protection table to prohibit writing by the second processing unit to the electronic memory in the first region holding the first program, and
confirm that the first core is blocked by its memory management unit from writing in the second region.

17. The method of claim 16 wherein the first and second cores include hardware interrupt circuitry responsive to interrupt signals to jump to an interrupt vector for execution of instructions at the interrupt vector and wherein the hardware memory management unit of the first core provides a given hardware interrupt signal to the first core when a write to an address associated with a set protection flag is attempted and wherein the first core executes given interrupt service instructions at the interrupt vector associated with the given hardware interrupt signal to report a write failure to the second core.

18. The method of claim 17 wherein the first and second core set protection flags of their respective memory management units to permit writing to the electronic memory in a shared region and wherein the given interrupt service instructions cause a key writing to the electronic memory by the first core in at least one address of the shared region, the key writing indicating a write failure and wherein the second ore confirms that the first core is blocked by its memory management unit from writing in the second region by testing for the key writing and provokes a safety state if that test indicates the key writing has not occurred.

19. The method of claim 17 wherein the first core periodically attempts to write to the second region at different portions of the second region.

20. A computer architecture for a safety industrial controller:
a first and second processor each including hardware memory management units;
an electronic memory having a plurality of addresses electronically addressable by both the first and second processor and holding a first and second program executable by the first and second processors respectively;

wherein the hardware memory management unit corresponding to the first processor manages a first memory protection table and the hardware memory management unit corresponding to the second processor manages a second memory protection table, each of the first and second memory management units having entries mapping to addresses of the electronic memory and wherein the entries hold protection flags which when set block a writing to addresses of the entries;

wherein the first processor is configured to:

(i) set protection flags in the first memory protection table to permit writing by the first processor to the electronic memory in a first region holding the first program and to prohibit writing by the first processor to the electronic memory in a second region holding the second program; and (ii) periodically attempt to write to the second region; and wherein the second processor is configured to:

(i) set protection flags in the second memory protection table to permit writing by the second processor to the electronic memory in the second region holding the second program and to prohibit writing by the second processor to the electronic memory in the first region holding the first program; and (ii) confirm that the first processor is blocked by its memory management unit from writing in the second region.

* * * * *